(12) United States Patent
Stewart et al.

(10) Patent No.: US 7,014,701 B2
(45) Date of Patent: Mar. 21, 2006

(54) INORGANIC PIGMENTS

(75) Inventors: Kimberly Ann Stewart, Bethel Park, PA (US); Terry J. Detrie, Canonsburg, PA (US); Gilbert B. Burkhart, III, Washington, PA (US); Daniel R. Swiler, Washington, PA (US)

(73) Assignee: Ferro Corporation, Cleveland, OH (US)

( * ) Notice: Subject to any disclaimer, the term of this patent is extended or adjusted under 35 U.S.C. 154(b) by 322 days.

(21) Appl. No.: 10/649,317

(22) Filed: Aug. 27, 2003

(65) Prior Publication Data
US 2005/0049347 A1 Mar. 3, 2005

(51) Int. Cl.
*C04B 14/00* (2006.01)

(52) U.S. Cl. .................... 106/480; 106/480; 423/600; 524/398; 524/399; 524/415; 524/567

(58) Field of Classification Search ................ 106/480; 423/600; 524/398, 399, 415, 567
See application file for complete search history.

(56) References Cited

U.S. PATENT DOCUMENTS 4,696,700 A * 9/1987 Fischer et al. ............... 106/415

* cited by examiner

*Primary Examiner*—C. Melissa Koslow
*Assistant Examiner*—Shalie A. Manlove
(74) *Attorney, Agent, or Firm*—Rankin, Hill, Porter & Clark LLP

(57) ABSTRACT

The present invention provides inorganic pigments including cobalt and aluminum having the spinel crystalline structure that exhibit improved color and/or weatherability in paint and polymer applications. Inorganic pigments according to the invention are formed by adding small quantities of a phosphate compound such as aluminum phosphate and, optionally, chromium (III) oxide, to a raw batch that includes a mixture of cobalt-containing and aluminum-containing inorganic pigment precursors, and calcining the raw batch to obtain the inorganic pigment.

22 Claims, 3 Drawing Sheets

INORGANIC PIGMENTS

BACKGROUND OF THE INVENTION

1. Field of Invention

The present invention relates to inorganic pigments. More particularly, the present invention relates to inorganic pigments comprising cobalt and aluminum having a spinel crystalline structure that exhibit improved color and/or weatherability when used in paint and polymer applications and a method of making the same.

2. Description of Related Art

Inorganic pigments having the spinel crystalline structure can be represented by the general formula: $AB_2O_4$, where A is a divalent element or combination of divalent elements and B is a trivalent element or combination of trivalent elements. One common example of an inorganic pigment having a spinel crystalline structure is cobalt aluminate blue spinel (basic chemical formula: $CoAl_2O_4$), in which substantially all of the cations represented by A in the general formula $AB_2O_4$ comprise the element cobalt and substantially all of the cations represented by B in the general formula $AB_2O_4$ comprise the element aluminum. Other inorganic pigments comprising cobalt and aluminum having the spinel crystalline structure include, for example: cobalt zinc aluminate blue spinel (basic chemical formula: $(Co,Zn)Al_2O_4$); zinc chrome cobalt aluminum spinel (basic chemical formula: $(Zn,Co)(Cr,Al)_2O_4$); cobalt chromite blue-green spinel (basic chemical formula: $Co(Al,Cr)_2O_4$); and cobalt tin alumina blue spinel (basic chemical formula: $CoAl_2O_4/Co_2SnO_4$).

In many cases inorganic pigments comprising cobalt and aluminum having the spinel crystalline structure will be modified such that the crystalline structure includes predetermined amounts of cations of divalent and/or trivalent elements other than cobalt and aluminum, which modifies the resulting color of the pigment. Suitable modifiers for such inorganic pigments include, for example, any one or a combination of the following elements: chromium, lithium, magnesium, silicon, strontium, tin, titanium and zinc.

Inorganic pigments comprising cobalt and aluminum having a spinel structure most commonly produced via the high temperature calcination of a raw batch of vigorously intermixed powders containing cobalt and aluminum such as, for example, cobalt (II) oxide (basic formula: CoO) powder and aluminum (III) oxide (basic formula: $Al_2O_3$) powder. The reaction product formed via high temperature calcination of the raw batch is a substantially homogeneous cystalline matrix of spinel. Mineralizers, which facilitate a reaction without being part of the desired product, are sometimes utilized to aid the reaction. Conventional mineralizers used in inorganic pigments include NaCl, $CaCl_2$, KCl and $CaSO_4$. Often, the calcined product is ground after calcination to improve its pigmentary properties.

Inorganic pigments comprising cobalt and aluminum having the spinel crystalline structure are used in a variety of applications including, for example, paints and polymers. Paints and polymers containing such inorganic pigments are often exposed to ultraviolet (UV) radiation (e.g., from sunlight) and other environmental conditions. The intensity and color of paint films and polymer products containing such inorganic pigments tend to degrade upon extended exposure to the environment, and over time such paint films and polymer products tend to develop an undesirable faded or bleached out appearance.

BRIEF SUMMARY OF THE INVENTION

The present invention provides inorganic pigments comprising cobalt and aluminum having a spinel crystalline structure that exhibit improved color and/or weatherability in paint and polymer applications. Inorganic pigments according to the invention are formed by adding a phosphate compound, preferably aluminum phosphate, to a raw batch comprising cobalt and aluminum containing raw materials and calcining the raw batch. The presence of the phosphate compound in the raw batch acts as a mineralizer, which facilitates the formation of the spinel crystalline structure but may not become a part of the crystalline structure. The resulting inorganic pigment exhibits higher chroma values, as defined by the standard CIELAB $L^*C^*h^\circ$ system. Moreover, the resulting inorganic pigment also exhibits a reduced pH as compared to similar conventional inorganic pigments.

In the case of $CoAl_2O_4$ spinel pigments, the increased chroma due to addition of phosphate mineralizer manifests itself as a more blue and more red pigment. Because of this shift in color, chromium (III) oxide can also be added to the raw batch to adjust the color of the resulting pigment to closely approximate the color of conventional inorganic pigments comprising cobalt and aluminum having the spinel crystalline structure. The presence of chromium (III) oxide in the raw batch provides additional advantages including, for example, an inorganic pigment that exhibits improved UV absorption and has a lower pH. Unlike the phosphate compound, the chromium (III) oxide appears to be incorporated in the spinel crystalline structure.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Inorganic pigments comprising cobalt and aluminum having the spinel crystalline structure according to the present invention are preferably formed via high temperature calcination of a raw batch comprising a blend of a cobalt-containing inorganic pigment precursor, an aluminum-containing inorganic pigment precursor and a phosphate compound, which acts as a mineralizer. Throughout the instant specification and in the appended claims, the phrase "inorganic pigment precursor" refers to any compound that can be calcined in the presence of another compound to form a mixed metal oxide inorganic pigment. Examples of suitable cobalt-containing inorganic pigment precursors for use in the raw batch include cobalt oxides (which, depending upon processing conditions and source, can come in any one or a combination of forms such as CoO, $Co_3O_4$ and Co(OH)

$_2$), cobalt carbonates, and chlorides. Examples of suitable aluminum-containing inorganic pigment precursors for use in the raw batch include aluminum oxides (e.g., $Al_2O_3$, and various hydrated aluminas $Al(OH)_3$) and chlorides.

Virtually any inorganic pigment comprising cobalt and aluminum having the spinel crystalline structure can be formed in accordance with the invention. Common examples of inorganic pigments comprising cobalt and aluminum having the spinel crystalline structure include, for example: cobalt aluminate blue spinel (C.I. Pigment Blue 28, basic chemical formula: $CoAl_2O_4$, which may include any one or a combination of the modifiers $Li_2O$, MgO, $TiO_2$ or ZnO); cobalt zinc aluminate blue spinel (C.I. Pigment Blue 72, basic chemical formula: $(Co,Zn)Al_2O_4$, which may include any one or a combination of the modifiers $Li_2O$, MgO or $TiO_2$); zinc chrome cobalt aluminum spinel (C.I. Pigment Blue 36:1, basic chemical formula: $(Zn,Co)(Cr,Al)_2O_4$, which may include any one or a combination of the modifiers $SiO_2$, $SrO_2$, $TiO_2$ or ZnO); cobalt chromite blue-green spinel (C.I. Pigment Blue 36, basic chemical formula: $Co(Al,Cr)_2O_4$, which may include any one or a combination of the modifiers MgO, $SiO_2$, $TiO_2$, ZnO or $SrO_2$); and cobalt tin alumina blue spinel (basic chemical formula: $CoAl_2O_4/Co_2SnO_4$, which may include one or a combination of the modifiers $SiO_2$ or ZnO).

Figure 1:
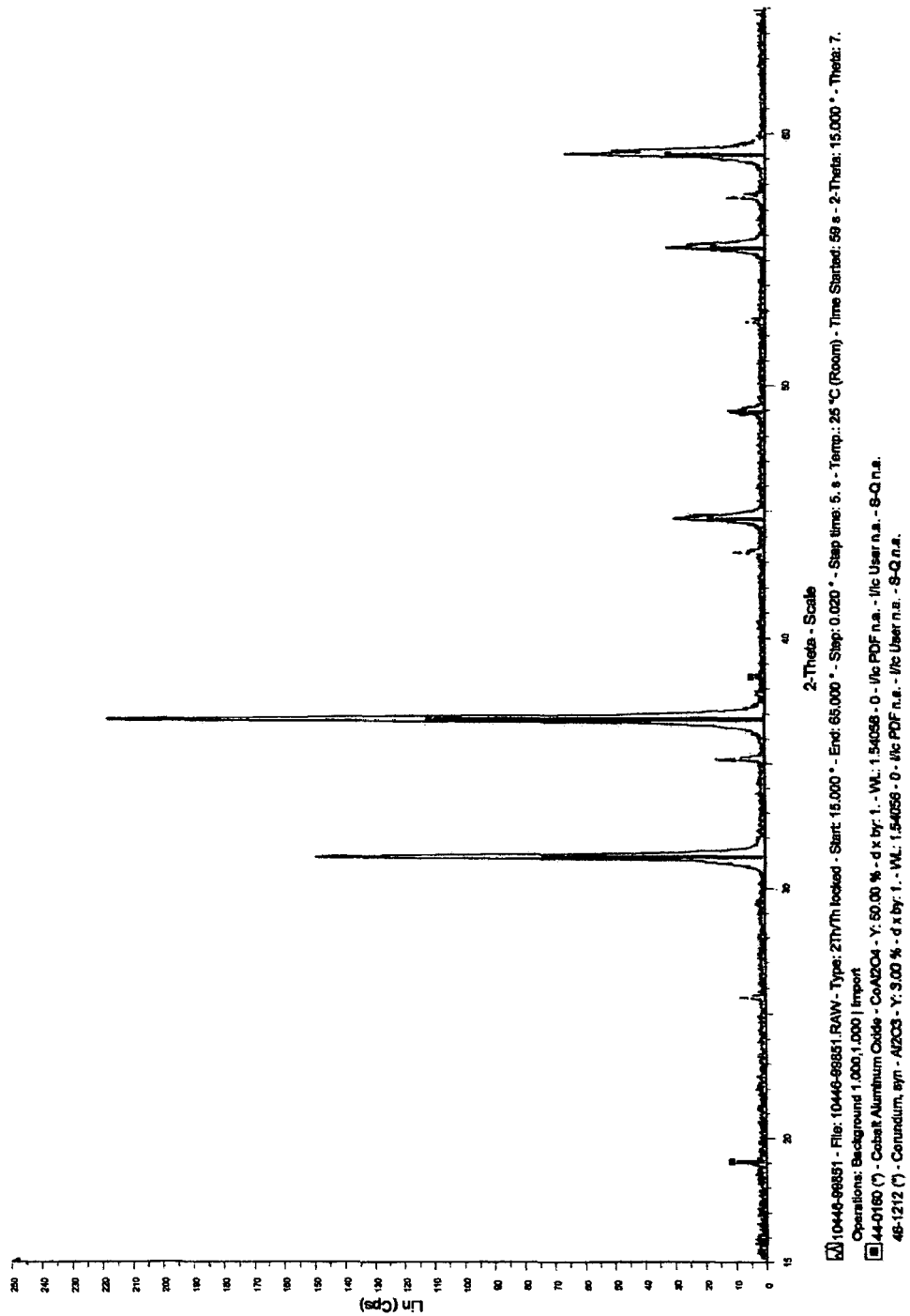
FIG. 1 shows the X-ray diffraction pattern of a conventional cobalt aluminate blue pigment.
Figure 2:
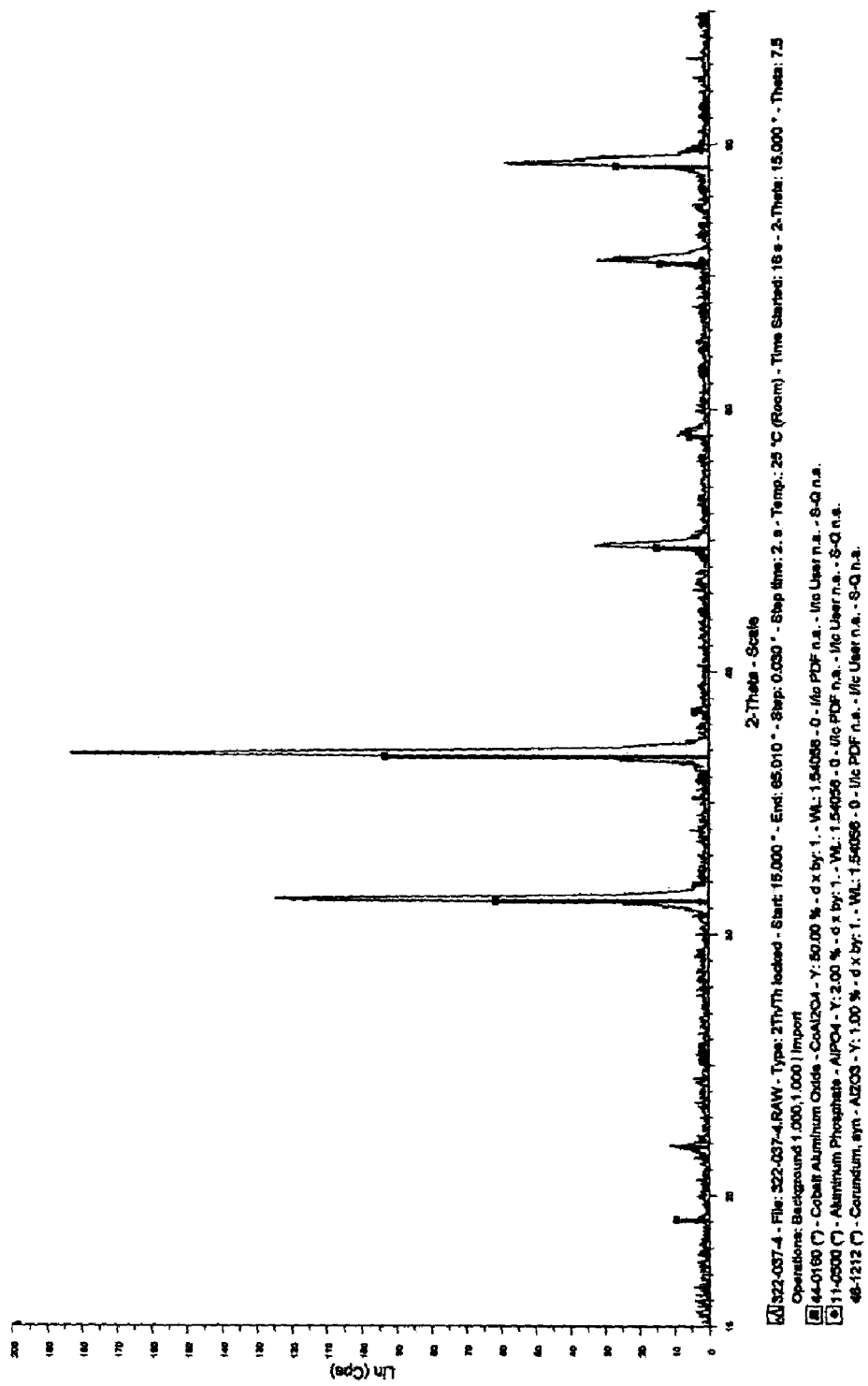
FIG. 2 shows the X-ray diffraction pattern of an exemplary cobalt aluminate blue pigment according to the invention.

The phosphate compound in the raw batch seems to act as a mineralizer, meaning that it promotes and facilitates the formation of the desired spinel crystalline structure, but does not appear to be incorporated into the spinel crystalline structure. FIGS. 1 and 2 show the X-ray diffraction patterns of a conventional cobalt aluminate blue pigment and an exemplary cobalt aluminate blue pigment according to the invention, respectively. Throughout the instant specification, use of the word "conventional" in relation to an inorganic pigment means that the inorganic pigment was obtained by firing a raw batch that did not contain any phosphate compounds. The X-ray diffraction pattern for the cobalt aluminate blue pigment according to the invention (FIG. 2) shows a more phase-pure spinel, without the corundum crystalline phase, than is shown in conventional cobalt aluminate blue pigment (FIG. 1). Furthermore, some aluminum phosphate is noted in the pattern for the cobalt aluminate blue pigment according to the invention (FIG. 2), which is not present in the conventional cobalt aluminate blue pigment (FIG. 1).

A variety of phosphate compounds can be used in the practice of the present invention. The preferred phosphate compound for use in the invention is aluminum phosphate. However, other phosphates, such as ammonium dihydrogen phosphate for example, can be used. Aluminum phosphate is preferred because aluminum is an element present in the resulting spinel crystalline structure of the inorganic pigment and thus aluminum phosphate does not introduce potentially color-altering cations to the raw batch. Various forms of aluminum phosphate can be used in the invention including, for example, aluminum metaphosphate (basic formula: $Al(PO_3)_3$), aluminum orthophosphate (basic formula: $AlPO_4$), or combinations of thereof. Aluminum metaphosphate is presently most preferred because it provides a higher level of phosphate than aluminum orthophosphate.

The phosphate compound will generally comprise from about 0.1% to about 12% of the raw batch by weight. The improvements in color, weatherability and/or degree of crystallinity appear to be increase as the amount of the phosphate compound present in the raw batch increases from about 0.1% to about 2.5% by weight. And, although amounts up to about 12% by weight of the raw batch can be used without adverse consequences, there does not appear to be any significant improvement in color and/or weatherability for additions in amounts greater than about 2.5% by weight of the total raw batch. Accordingly, the phosphate compound preferably comprises from about 1.5% to about 2.5% of the raw batch by weight.

As previously noted, the presence of a phosphate compound in the raw batch affects the color of the resulting pigment. The most widely used system for characterizing the color of a pigment is the CIELAB $L^*a^*b^*$ color scale or system. According to the CIELAB $L^*a^*b^*$ system, the $L^*$ value refers to the lightness of the sample, with $L^*=100$ designating the lightness upper limit and $L^*=0$ designating the darkness lower limit. The $a^*$ value describes the red or green value of the pigment, with a positive $a^*$ value designating red, and a negative $a^*$ value designating green. The $b^*$ value represents the blue or yellow value, with a positive $b^*$ value designating yellow and a negative $b^*$ value designating blue. Color can also be described using CIELAB $L^*C^*h^o$, which is simply a polar notation of the standard CIELAB $L^*a^*b^*$ system. The $C^*$ component indicates the chroma; larger values of $C^*$ indicate more saturated pigments. The $h^o$ component indicates the hue angle; angles of 0°, 90°, 180°, and 270° correspond to red, yellow, green, and blue hues, respectively.

The presence of a phosphate compound in the raw batch produces inorganic pigments that are generally more chromatic than conventional inorganic pigments that are fired at the same temperature (typically about 1305° C.). For example, in most $CoAl_2O_4$ and $Co(Cr,Al)_2O_4$ spinel pigments, the presence of the phosphate compound in the raw batch has the unexpected result of facilitating the production of an inorganic pigment that exhibits a more negative $b^*$ color value, as compared to a conventional inorganic pigment of the same stoichiometric composition that has been fired at the same temperature. The presence of a phosphate compound in the raw batch therefore allows for a reduction in calcination temperature of up to 150° C. to produce inorganic pigments exhibiting the same color as conventional inorganic pigments that are fired at higher temperature.

Inclusion of a phosphate compound in the raw batch has the added benefit of lowering the pH of the fired material. In $CoAl_2O_4$ pigments for example, the pH can be reduced from about 10 to as low as about 8, depending upon the amount of phosphate added. Generally speaking, the more phosphate compound added to the raw batch, the lower the pH of the resultant inorganic pigment. A reduction in pH is advantageous when the inorganic pigment is used in paint and polymer applications. Especially in acid-cured resins, lower pH appears to promote better weathering in such applications.

One other potential advantage provided by the presence of a phosphate compound in the raw batch is that it tends to facilitate the formation of the spinel crystalline structure and thereby reduce the amount of or eliminate entirely any excess unreacted aluminum oxide present in the resulting pigment. It is believed that the presence of small amounts of unreacted excess aluminum oxide in conventional inorganic pigments may contribute to the degradation of the pigments upon extended weathering.

For spinel pigments containing chromium, another potential advantage provided by the presence of a phosphate compound in the raw batch is that it tends to reduce the amount of, or eliminate entirely, excess unreacted chromium oxide present in the resulting pigment. While the amount of free chromium oxide is typically too small to be observed by X-Ray diffraction, its presence can be confirmed by the yellowing of the filtrate water from washing a wet milled pigment. The reduction in free chrome through the use of the phosphate compound in the raw batch is advantageous in that it allows for easier washing for pigments where soluble chrome is a concern. The filtrate from such washings is clear, rather than yellow.

As noted above, phosphate modified cobalt aluminate spinel pigments exhibit an increased chromaticity. To counteract this tendency, the raw batch can further optionally comprise chrome (III) oxide (basic formula: $Cr_2O_3$) and/or other chromium-containing inorganic pigment precursors to adjust the color of the resultant pigment back toward that which is observed in conventional cobalt aluminate spinel. The amount of chromium-containing inorganic pigment precursors present in the raw batch should not exceed 10% by weight. The presently preferred range is from about 0.1% to about 5% by weight, with about 1.5% by weight being most preferred.

Unlike the phosphate compound, the chromium-containing inorganic pigment precursor does appear to become incorporated in the crystalline spinel structure of the resultant pigment. The chromium-containing inorganic pigment precursor tends to cancel out the increase in redness and blueness provided by the phosphate compound, and also further lowers the pH of the resulting pigment. pH values of about 7 are typical when the raw batch includes both a phosphate compound and a chromium-containing inorganic pigment precursor.

The reduction in pH and the presence of chromium in the crystalline spinel structure appears to contribute significantly to the improved color retention and weatherability noted in the pigment. When a cobalt aluminate blue pigment was formed from a raw batch that included both aluminum metaphosphate and chromium (III) oxide, the resulting cobalt aluminate blue pigment provided superior weatherability results in paints and polymers, particularly polyvinylidene fluoride (PVDF) coating formulations and in polyvinylchloride (PVC) resins, than any conventional cobalt aluminate blue pigment tested.

Inorganic pigments comprising cobalt and aluminum having the spinel crystalline structure according to the invention can be produced using conventional pigment production equipment. Typically, the raw materials comprising the raw batch are blended together using a high intensity blender or other mixing device to obtain a substantially homogeneous mix. The relative amounts of the materials to be added to the raw batch will depend upon the composition of the starting materials and the desired stoichiometry and color of the desired inorganic pigment. For example, when a cobalt aluminate blue pigment is desired, the raw batch may consist of a blend of CoO and $Al_2O_3.3H_2O$ to yield a molar ratio of CoO to $Al_2O_3$ of about 0.8 to about 0.9. The weight ratio, of course, will depend upon the degree to which the materials are hydrated. The particle size of the starting materials is preferably 0.2–20 $\mu$m. This is typical in pigment production.

As in the formulation of other inorganic pigments, minor amounts of other compounds can be added to the raw batch as desired in order to provide elements (sometimes called "dopants") that enhance or modify various properties of the resulting pigment. Suitable dopants may include any one or more of the elements in Groups I-A, III-A, IV-A, V-A, VI-A, VII-A, VIII-A, I-B, II-B, III-B, IV-B, V-B, VI-B, VIII-B of the Periodic Table, as well as elements in the Lanthanide and Actinide series.

Once the raw batch has been blended together, the raw batch must be calcined in a kiln. As noted above, lower calcination temperatures can be utilized to control color development. Ramp and soak times will be dependent upon the amount of material being fired and the color desired. Typical peak firing/soak temperatures will be about 1150–1350° C. for 2–12 hour soak.

After calcination, the fired cake may be milled, if necessary. Milling can be accomplished using wet techniques, such as through the use of zirconia milling media, or via dry techniques such as through the use of an air mill. Milling is performed primarily to deagglomerate the pigment particles and to provide some minimal grind to a good color value in desired applications.

After the raw batch has been calcined, it comprises an inorganic pigment comprising cobalt and aluminum having the spinel crystalline structure that further comprises a phosphate mineralizer. The resulting inorganic pigment is suitable for use in all applications where conventional inorganic pigments are used, and is particularly suitable for use in paints and polymer applications such as PVC exterior siding.

The following examples are intended only to illustrate the invention and should not be construed as imposing limitations upon the claims.

PREPARATION OF COMPARATIVE EXAMPLES 1 AND 2

A 200 g raw batch consisting of about 33.80% by weight cobalt (II) oxide powder (60% cobalt metal, particle size ~14 $\mu$m), and about 66.20% by weight alumina trihydrate powder (basic formula: $Al_2O_3.3H_2O$, particle size ~0.3 $\mu$m) was blended for 2 minutes at high speed using a Osterizer blender. After blending, the raw batch was split into two equal parts. In Example 1, half of the raw batch was fired in a gas fired periodic kiln with atmosphere $pO_2 \geq 4\%$ at peak temperature of 1305° C. with a 6 hr. ramp and a 2.5 hr. soak time. In Example 2, the other half of the raw batch was fired in a gas fired periodic kiln with atmosphere $pO_2 \geq 4\%$ at peak temperature of 1180° C. with a 6 hr. ramp and a 2.5 hr. soak time. In each case, after the resulting cobalt aluminate blue pigment was allowed to cool to room temperature, the pigment was ground in water using a ball mill until a pigment having an average particle size of 0.9 $\mu$m was obtained. The pigment slurry was filtered and dried.

PREPARATION OF EXAMPLES 3 AND 4

A 200 g raw batch consisting of about 33.06% by weight cobalt (II) oxide powder (60% cobalt metal, particle size ~14 $\mu$m), about 64.78% by weight alumina trihydrate powder (basic formula: $Al_2O_3.3H_2O$, particle size ~0.3 $\mu$m) and about 2.15% by weight aluminum metaphosphate powder (basic formula: $Al(PO_3)_3$, particle size ~11 $\mu$m) was blended for 2 minutes at high speed using a Osterizer blender. After blending, the raw batch was split into two equal parts. In Example 3, half of the raw batch was fired in a gas fired periodic kiln with atmosphere $pO_2 \geq 4\%$ at peak temperature of 1305° C. with a 6 hr. ramp and a 2.5 hr. soak time. In Example 4, the other half of the raw batch was fired in a gas fired periodic kiln with atmosphere $pO_2 \geq 4\%$ at peak temperature of 1180° C. with a 6 hr. ramp and a 2.5 hr. soak time. In each case, after the resulting cobalt aluminate blue pigment was allowed to cool to room temperature, the pigment was ground in water using a ball mill until a pigment having an average particle size of 0.9 $\mu$m was obtained. The pigment slurry was filtered and dried.

Color Analysis of Examples 1–4

Pigment samples from Examples 1–14 were subjected to color analysis. Masstone trials were prepared by mixing 2 grams of pigment with 70 grams of a rigid polyvinylchloride (RPVC) resin system, with a total combined weight of 72 grams. Tint trials were prepared by mixing 2 grams of pigment with 70 grams of a RPVC resin system containing 10% $TiO_2$, with a total combined weight of 72 grams. For both trials, the pigment was dispersed within the PVC at 420° F. on a two-roll mill for 3 minutes. Measurements of color values were performed using a Spectraflash SF600 spectrophotometer. The pigment color was defined by the standard CIELAB system, as shown in Table 1. The results show that the addition of a phosphate compound to the raw batch (i.e., Examples 3 and 4) shifts the color of the resulting pigment more red and more blue than a conventional pigment (i.e., Examples 1 and 2). For the unmodified formula, there is a significant color shift green and yellow with decreasing soak temperature (Example 2). For the phosphate modified formula, the lower firing temperature (Example 4) simply shifts the color closer to the unmodified, high temperature trial (Example 1).

phosphate powder (basic formula: $Al(PO_3)_3$, particle size ~11 μm) was blended for 2 minutes at high speed using a Osterizer blender. After blending, the raw batch was split into two equal parts. In Example 7, half of the raw batch was fired in a gas fired periodic kiln with atmosphere $pO_2 \geq 4\%$ at peak temperature of 1305° C. with a 6 hr. ramp and a 2.5 hr. soak time. In Example 8, half of the raw batch was fired in a gas fired periodic kiln with atmosphere $pO_2 \geq 4\%$ at peak temperature of 1260° C. with a 6 hr. ramp and a 2.5 hr. soak time. In each case, after the resulting cobalt chrome aluminate pigment was allowed to cool to room temperature, the pigment was ground in water using a ball mill and until a pigment having an average particle size of 2.0 μm was obtained. The pigment slurry was filtered and dried.

Color Analysis of Examples 5–8

Samples of the pigments formed in Examples 5–8 were subjected to color analysis. Masstone trials were prepared by mixing 2 grams of pigment with 70 grams of a rigid polyvinylchloride (RPVC) resin system, with a total com-

TABLE 1

| | | MT, PVC | | | | | Tint, PVC | | | | |
|---|---|---|---|---|---|---|---|---|---|---|---|
| Example | Conditions | L* | a* | b* | C* | h° | L* | a* | b* | C* | h° |
| 1 | No mod; 1305° C. | 40.46 | 5.24 | −45.72 | 46.02 | 276.53 | 71.83 | −8.48 | −31.93 | 33.04 | 255.13 |
| 2 | No mod; 1180° C. | 39.71 | 0.56 | −38.89 | 38.90 | 270.82 | 71.47 | −9.60 | −29.81 | 31.32 | 252.15 |
| 3 | Phosphate; 1305° C. | 39.96 | 8.67 | −48.73 | 49.49 | 280.09 | 72.46 | −7.24 | −31.99 | 32.80 | 257.24 |
| 4 | Phosphate; 1180° C. | 40.25 | 7.56 | −47.61 | 48.21 | 279.02 | 72.36 | −7.77 | −31.51 | 32.45 | 256.15 |

PREPARATION OF COMPARATIVE EXAMPLES 5 AND 6

A 200 g raw batch consisting of about 39.40% by weight cobalt (II) oxide powder (60% cobalt metal, particle size ~14 μm), about 26.56% by weight alumina monohydrate powder (basic formula: $Al_2O_3 \cdot H_2O$, particle size ~11 μm), about 3.40% aluminum oxide powder (particle size ~8.5 μm), and 30.64% by weight chromium (III) oxide powder (particle size ~1.2 μm) was blended for 2 minutes at high speed using a Osterizer blender. After blending, the raw batch was split into two equal parts. In Example 5, half of the raw batch was fired in a gas fired periodic kiln with atmosphere $pO_2 \geq 4\%$ at peak temperature of 1305° C. with a 6 hr. ramp and a 2.5 hr. soak time. In Example 6, the other half of the raw batch was fired in a gas fired periodic kiln with atmosphere $pO_2 \geq 4\%$ at peak temperature of 1260° C. with a 6 hr. ramp and a 2.5 hr. soak time. In each case, after the resulting cobalt chrome aluminate pigment was allowed to cool to room temperature, the pigment was ground in water using a ball mill and until a pigment having an average particle size of 2.0 μm was obtained. The pigment slurry was filtered and dried.

PREPARATION OF EXAMPLES 7 AND 8

A 200 g raw batch consisting of about 39.01% by weight cobalt (II) oxide powder (60% cobalt metal, particle size ~14 μm), about 26.30% by weight alumina monohydrate powder (basic formula: $Al_2O_3 \cdot H_2O$, particle size ~11 μm), about 3.37% by weight aluminum oxide powder (particle size ~8.5 μm), 30.34% by weight chromium (III) oxide powder (particle size ~1.2 μm), and 0.99% by weight aluminum metabined weight of 72 grams. Tint trials were prepared by mixing 2 grams of pigment with 70 grams of a RPVC resin system containing 10% $TiO_2$, with a total combined weight of 72 grams. For both trials, the pigment was dispersed within the PVC at 420° F. on a two-roll mill for 3 minutes. Measurements of color values were performed using a Spectraflash SF600 spectrophotometer. The pigment color was defined by the standard CIELAB system, as shown in Table 2 below. The results clearly show that the addition of a phosphate compound to the raw batch shifts the color of the resulting pigment more blue. For the unmodified raw batch formulation, there is a significant color shift yellow with decreasing soak temperature (Example 6). For the phosphate-modified raw batch formula, the lower firing temperature (Example 8) simply shifted the color closer to the unmodified, high temperature trial (Example 5).

British Toy Analysis of Examples 5–8

When the pigments formed in Examples 5–8 were water washed and filtered, the filtrate for Examples 5 and 6 was yellow whereas the filtrate for Examples 7 and 8 was clear. The washed and dried pigments were tested for soluble chrome in accordance with British Toy Test analysis, EN71.3 European Standard for Safety of Toys. As shown in Table 2 below, the pigments formed with a phosphate compound in the raw batch (Examples 7 and 8) showed a significantly lower level of soluble chrome than did the pigments formed without a phosphate compound in the raw batch (Examples 5 and 6).

TABLE 2

| | | | MT, PVC | | | | | Tint, PVC | | | | |
|---|---|---|---|---|---|---|---|---|---|---|---|---|
| Example | Conditions | ppm Cr | L* | a* | b* | C* | h° | L* | a* | b* | C* | h° |
| 5 | No mod; 1305° C. | 336 | 38.18 | −14.13 | −21.40 | 25.65 | 236.57 | 73.07 | −14.28 | −17.31 | 22.44 | 230.48 |
| 6 | No mod; 1260° C. | 348 | 36.96 | −14.00 | −18.39 | 23.11 | 232.73 | 73.37 | −13.58 | −14.84 | 20.11 | 227.54 |
| 7 | Phosphate; 1305° C. | 81 | 38.11 | −14.13 | −22.24 | 26.35 | 237.56 | 72.59 | −14.33 | −18.14 | 23.12 | 231.68 |
| 8 | Phosphate; 1260° C. | 183 | 37.59 | −14.41 | −21.05 | 25.51 | 235.61 | 72.95 | −14.20 | −16.97 | 22.13 | 230.09 |

PREPARATION OF EXAMPLE 9

A 100 g raw batch consisting of about 32.59% by weight cobalt (II) oxide powder (60% cobalt metal, particle size ~14 μm), about 63.84% by weight alumina trihydrate powder (basic formula: $Al_2O_3 \cdot 3H_2O$, particle size ~0.3 μm), about 2.12% by weight aluminum metaphosphate powder (basic formula: $Al(PO_3)_3$, particle size ~11 μm), and 1.45% by weight chromium (III) oxide powder (particle size ~1.2 μm) was blended for 2 minutes at high speed using a Osterizer blender. After blending, the raw batch was fired in a gas fired periodic kiln with atmosphere $pO_2 \geq 4\%$ at peak temperature of 1305° C., with a 6 hr. ramp and a 2.5 hr. soak time. After the resulting cobalt aluminate blue pigment was allowed to cool to room temperature, the pigment was ground in water using a ball mill and until a pigment having an average particle size of 0.9 μm was obtained. The pigment slurry was filtered and dried.

X-Ray Diffraction Analysis of Examples 1, 3 and 9

Figure 3:
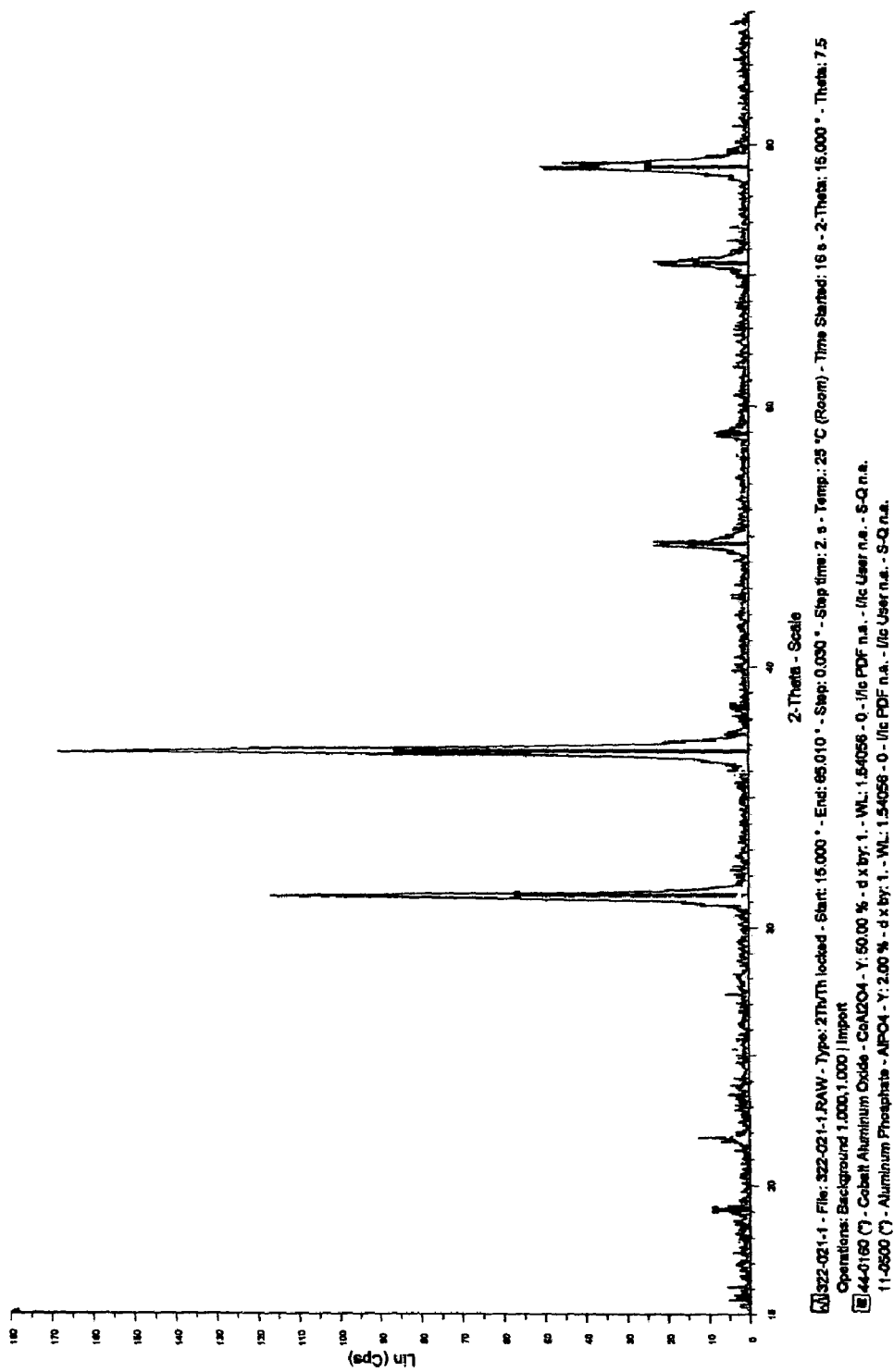
FIG. 3 shows the X-ray diffraction pattern of another exemplary cobalt aluminate blue pigment according to the invention.

FIGS. 1, 2 and 3 show the X-ray diffraction pattern of samples prepared from a conventional cobalt aluminate blue pigment available from Ferro Corporation under the trade designation 10446, Example 3, and Example 9, respectively. Comparison of the X-ray diffraction patterns shows either a significant reduction or elimination of $Al_2O_3$ phase in the samples formulated with a phosphate compound in the raw batch (Examples 3 and 9). It is believed that any excess alumina present in the pigment has been converted to $AlPO_4$.

Color Analysis of Examples 1, 3 and 9

Samples of the pigments formed in Examples 1, 3 and 9 subjected to color analysis. Masstone trials were prepared by mixing 2 grams of pigment with 70 grams of a rigid polyvinylchloride (RPVC) resin system, with a total combined weight of 72 grams. Tint trials were prepared by mixing 2 grams of pigment with 70 grams of a RPVC resin system containing 10% $TiO_2$, with a total combined weight of 72 grams. For both trials, the pigment was dispersed within the PVC at 420° F. on a two-roll mill for 3 minutes. Measurements of color values were performed using a Spectraflash SF600 spectrophotometer. The pigment color was defined by the standard CIELAB system, as shown in Table 3 below. The results show that the phosphate modified pigments (Examples 3 and 9) are significantly more red and blue than the conventional blue pigment (Example 1) in masstone, and significantly more red in tint. The use of chrome (III) oxide with phosphate (Example 9) yielded a color similar to conventional blue pigment (Example 1). The pH values are also reported. The use of phosphate (Example 3) resulted in a significantly lowered pH, and the use of chrome (III) oxide (Example 9) further reduced the pH.

TABLE 3

| | | | MT, PVC | | | | | Tint, PVC | | | | |
|---|---|---|---|---|---|---|---|---|---|---|---|---|
| Example | Additions | pH | L* | a* | b* | C* | h° | L* | a* | b* | C* | h° |
| 1 | None | 9.1 | 40.46 | 5.24 | −45.72 | 46.02 | 276.53 | 71.83 | −8.48 | −31.93 | 33.04 | 255.13 |
| 3 | Phosphate | 7.8 | 39.96 | 8.67 | −48.73 | 49.49 | 280.09 | 72.46 | −7.24 | −31.99 | 32.80 | 257.24 |
| 9 | Phosphate + Chrome | 7.0 | 39.93 | 4.57 | −44.71 | 44.94 | 275.84 | 71.71 | −8.55 | −31.66 | 32.79 | 254.89 |

PREPARATION OF COMPARATIVE EXAMPLE 10 AND EXAMPLES 11 AND 12

Example 10 was prepared by treating 50 grams of the conventional cobalt aluminate spinel pigment sold by Ferro Corporation under the trade designation 10446 with 1 mL of 1 M sulfuric acid in a ball mill to assist washing of any soluble salts. Example 11 was prepared by treating 50 grams of the pigment obtained from Example 3 with 1 mL of 1 M sulfuric acid in a ball mill to assist washing of any soluble salts. Example 12 was was prepared by treating 50 grams of the pigment obtained from Example 9 with 1 mL of 1 M sulfuric acid in a ball mill to assist washing of any soluble salts. In each case, the treated pigment slurries were filtered and dried.

EXAMPLE 13

13.50 g of the pigments formed in Example 3, 9, 10, 11 and 12, respectively, were separately added to a paint formulation comprising 86.50 g Kynar500®/Acrylic paint. For purposes of comparison, a "CONTROL" paint formulation was prepared using 13.50 g of a conventional cobalt aluminate blue pigment available from Ferro Corporation under the trade designation 10446. After thorough mixing, the paint formulations were applied to aluminum panels and subjected to accelerated-weathering testing using an Atlas QUV Weatherometer with 340 A bulbs. The test consisted of alternating cycles of 4 hours condensation and 4 hours UV light for a total of 2500 hours, with intermediate color measurements taken every 500 hours.

With reference to Table 4 below, the results of the weatherability testing show that the addition of a phosphate compound to the raw batch yields a spinel pigment having equal or superior light stability than conventional pigments. A significant improvement was observed when the phosphate-containing trials were washed with acid. The poor performance of acid treated CONTROL sample (Example 10) indicates that acid in itself does not improve light stability of the spinel pigment, but rather, the light stability improves only when the acid treatment is conducted in conjunction with the phosphate addition to the raw batch.

TABLE 4

| Trial | Modification | Time | L* | a* | b* | DL* | Da* | Db* | DE* |
|---|---|---|---|---|---|---|---|---|---|
| CONTROL | None | 0 | 39.40 | 2.01 | −41.66 | | | | |
| | | 2500 | 38.93 | 2.22 | −43.50 | −0.47 | 0.21 | −1.84 | 1.91 |
| Example 3 | Phosphate | 0 | 38.27 | 5.27 | −46.00 | | | | |
| | | 2500 | 37.74 | 5.75 | −47.52 | −0.53 | 0.48 | −1.52 | 1.68 |
| Example 9 | Phosphate + Chrome | 0 | 38.18 | 4.76 | −44.85 | | | | |
| | | 2500 | 38.04 | 5.06 | −46.48 | −0.14 | 0.30 | −1.63 | 1.66 |
| Example 10 | CONTROL + Acid | 0 | 39.09 | 2.92 | −43.62 | | | | |
| | | 2500 | 39.42 | 4.08 | −47.09 | 0.33 | 1.16 | −3.47 | 3.67 |
| Example 11 | Phosphate + Acid | 0 | 38.09 | 3.78 | −45.10 | | | | |
| | | 2500 | 38.38 | 3.78 | −46.00 | 0.29 | 0.00 | −0.90 | 0.95 |
| Example 12 | Phosphate + Chrome + Acid | 0 | 38.21 | 2.69 | −43.15 | | | | |
| | | 2500 | 38.14 | 2.70 | −44.61 | −0.07 | 0.01 | −1.46 | 1.46 |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming an inorganic pigment comprising cobalt and aluminum and having a spinel crystalline structure, the method comprising calcining a raw batch comprising a blend of a cobalt-containing inorganic pigment precursor, an aluminum-containing inorganic pigment precursor, and a phosphate compound.

2. The method according to claim 1 wherein the phosphate compound is an aluminum phosphate.

3. The method according to claim 1 wherein the phosphate compound is aluminum metaphosphate.

4. The method according to claim 1 wherein the phosphate compound is aluminum orthophosphate.

5. The method according to claim 1 wherein the phosphate compound comprises from about 0.1% to about 12% of the raw batch by weight.

6. The method according to claim 1 wherein the phosphate compound comprises from about 0.5% to about 2.5% of the raw batch by weight.

7. The method according to claim 1 wherein the raw batch further comprises a chromium-containing inorganic pigment precursor.

8. The method according to claim 7 wherein the chromium-containing inorganic pigment precursor is chromium oxide and is present in an amount up to about 10% of the raw batch by weight.

9. The method according to claim 8 wherein the chromium oxide comprises from about 0.1% to about 2.5% of the raw batch by weight.

10. The method according to claim 1 wherein subsequent to the calcining step, the inorganic pigment is treated with acid to remove soluble salts and dried.

11. An inorganic pigment comprising cobalt and aluminum having the spinel crystalline structure produced by the process comprising calcining a raw batch comprising a blend of a cobalt-containing inorganic pigment precursor, an aluminum-containing inorganic pigment precursor, and a phosphate compound.

12. The inorganic pigment according to claim 11 wherein the phosphate compound is an aluminum phosphate.

13. The inorganic pigment according to claim 11 wherein the phosphate compound is aluminum metaphosphate.

14. The inorganic pigment according to claim 11 wherein the phosphate compound is aluminum orthophosphate.

15. The inorganic pigment according to claim 11 wherein the phosphate compound comprises from about 0.1% to about 12% of the raw batch by weight.

16. The inorganic pigment according to claim 11 wherein the phosphate compound comprises from about 0.5% to about 2.5% of the raw batch by weight.

17. The inorganic pigment according to claim 11 wherein the raw batch further comprises a chromium-containing inorganic pigment precursor.

18. The inorganic pigment according to claim 7 wherein the chromium-containing inorganic pigment precursor is chromium oxide and is present in an amount up to about 10% of the raw batch by weight.

19. The inorganic pigment according to claim 18 wherein the chromium oxide comprises from about 0.1% to about 2.5% of the raw batch by weight.

20. A paint product comprising a paint base having an inorganic pigment comprising cobalt and aluminum having the spinel crystalline structure dispersed therein, wherein the inorganic pigment further comprises a phosphate compound.

21. A polymer product comprising a polymer having an inorganic pigment comprising cobalt and aluminum having the spinel crystalline structure dispersed therein, wherein the inorganic pigment further comprises a phosphate compound.

22. The polymer product according to claim 21 wherein the polymer comprises polyvinylchloride.

* * * * *